United States Patent
Le Noane et al.

[11] 4,060,309
[45] Nov. 29, 1977

[54] ADJUSTABLE CONNECTOR ASSEMBLY FOR LASER EFFECT DIODE, FOCUSSING LENS AND AN OPTICAL FIBRE IN OPTICAL FIBRE TRANSMISSION SYSTEM

[76] Inventors: Georges E. Le Noane, Kerrougant Bras, Tregastel, France, 22730; André M. Mathern, Route du Rusquet Brelevenez, Lannion, France, 22300

[21] Appl. No.: 689,122

[22] Filed: May 24, 1976

[30] Foreign Application Priority Data

May 27, 1975 France ................. 75.16470

[51] Int. Cl.² ................................ G02B 5/16
[52] U.S. Cl. .................................. 350/96 C
[58] Field of Search .............. 350/96 C, 96 WG; 250/227, 552; 331/94.5 C

[56] References Cited

U.S. PATENT DOCUMENTS

| 3,932,184 | 1/1976 | Cohen et al. ............ 331/94.5 C X |
| 3,936,143 | 2/1976 | Sato ............................ 350/96 C |
| 3,950,075 | 4/1976 | Cook et al. .............. 350/96 C X |
| 3,954,338 | 5/1976 | Hennel et al. ............ 350/96 C X |

*Primary Examiner*—John K. Corbin
*Assistant Examiner*—Rolf Hille

[57] ABSTRACT

An adjustable connector assembly for a laser effect diode, a focussing lens and an optical fibre in an optical fibre transmission system comprising a tubular body generally symetrical about the axis. One end of the tubular body, namely the front end, is provided with an adjustable diode socket assembly means including a first adjustment means at the front end and a socket means for filtering the focussing lens. The other end of the tubular body is provided with a fibre assembly means including transverse second adjustment means so that the ends of the optical fibres may be adjustably positioned in the transverse or *xy* plane relative to the axial direction, the Z axis of the tubular body. Thus the luminous ray or beam diverted by the diode is adjustable by the first adjustment means at the front end which can vary the position of the diode to the focussing lens in the Z divertion, e.g., axial direction, the transverse or *xy* adjustment at the fibre optic ends being provided by the second adjustment means at the other end of the connector. The connector is characterized in that said first adjustment means (10) comprises a first socket (21) carrying said diode (D) and secured with tight friction in a second socket (22) insertable in a predetermined position in the body (1) and in which a third socket (23) carrying the lens (4) can slide with easy fit. The connector also comprises radial fingers (232) screwed in the third socket (23) for positioning the lens, said fingers being freely guided in the axia direction through slots (103) provided in the body (1) and displaceable or immobilizable in said axial direction by means of nuts (24) framing said fingers and screwed on the outer periphery of said body.

4 Claims, 2 Drawing Figures

ADJUSTABLE CONNECTOR ASSEMBLY FOR LASER EFFECT DIODE, FOCUSSING LENS AND AN OPTICAL FIBRE IN OPTICAL FIBRE TRANSMISSION SYSTEM

BACKGROUND OF THE INVENTION

1. FIELD OF THE INVENTION

The present invention relates to diode connectors especially laser effect diode and focussing lens connectors adapted to connect the ends of optical fibres in a transmission system using optical fibres.

2. DESCRIPTION OF THE PRIOR ART

Up to now, laser effect diode connectors have been known only in the laboratory stage in which the various elements to be connected, and consequently to be positioned with respect to each other, are adjusted and held in position by micro-manipulators allowing displacements in three mutually perpendicular directions.

It is obvious that such devices cannot be satisfactorily used within the actual framework of an optical fibre commercial transmission system.

OBJECT OF THE INVENTION

The present invention has for its object the realizing of such a practical connector permitting easy and reliable successive disconnections and connections of the fibre and at the same time ensuring a good protection of both diode and fibre ends, minimum coupling losses, good stability against impacts and vibrations, temperature variations, moisture etc., and also permitting easy and rapid replacement of the diodes as well as of the fibre.

SUMMARY OF THE INVENTION

For the purpose of accomplishing the foregoing object a connector of the above-defined type is characterized according to the invention in that it is constituted by a symmetrical body of revolution of general tubular shape having at one of its ends, hereinafter called the front end, first means of assembly with the said diode and its supply circuit, and on the other hand a focusing lens, and at the other of its ends, hereinafter called the rear end, second means of assembly with an optical fibre; the said connector being further characterized in that the said first means are so arranged as to permit an adjustment (hereinafter called "in z") of the axial distance between the diode and the lens and in that the said second means are so arranged as to permit an adjustment (hereinafter called "in xy") of the position of the end of the fibre in the plane perpendicular to the revolution axis of the connector and containing the focusing point through the lens of the beam of rays originating from the diode.

BRIEF DESCRIPTION OF THE DRAWING

Other features and advantages of the connectors according to the invention will appear from the following detailed description of one of its preferred embodiments, made with reference to the annexed drawings, in which.

DESCRIPTION OF THE PREFERRED EMBODIMENT

Figure 1:
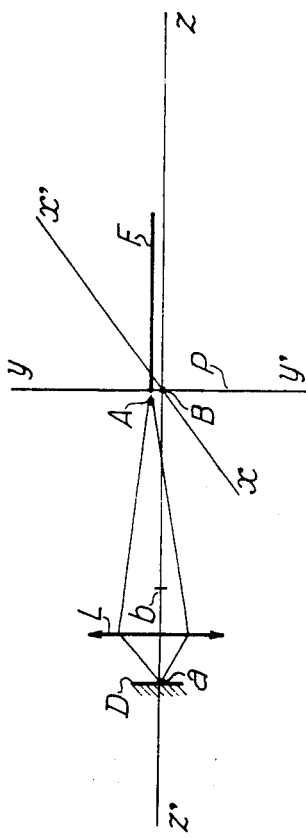
FIG. 1 is a diagram showing the "z"adjustments to be carried out of the lens with respect to the diode, and in "xy"of the inner end of the optical fibre.

Referring first to FIG. 1, if it is desired to couple to one another a laser diode D and an optical fibre F, in particular a low attenuation multimode fibre, it is desired to inject into the fibre the maximum possible part of the luminous power supplied by the diode. Now the diode has an emission diagram which does not much suit the fibre by reason of the narrowness of the receiving surface of the latter, typically shown as a circle of 20 μm (micrometers) diameter, and the smallness of its "capacity of acceptance or numerical opening" typically defined by an angle of incidence at most equal to 8°. In the case of a direct juxtaposition of the diode and of the fibre, one can scarcely expect an efficiency of the order of 10%. It is therefore advisable, to realize such a coupling, to interpose between the diode and the fibre an optical system which in a simple embodiment may be constituted by a lens L, in particular a lens with an index gradient particularly well adapted by its geometrical and optical characteristics to the problem to be solved.

It is however impossible to say "a priori" that a particular laser diode will have an emission well determined with respect to the so-called reference face of its casing. It is consequently necessary, as FIG. 1 shows, to provide on one hand, a position adjustment of the lens L along an axis $z'z$ between two points $a,b$ located a short distance from one another, to ensure for the given diode D focusing of a point A of a plane P perpendicular to $z'z$ at point B of the latter axis, said plane passing through the opposite end face of the fibre F; and, on the other hand a position adjustment of the latter said end face of the fibre in the plane P, in order that it may be centered on point A, which may be done by displacing the said fibre with respect to one and the other of two orthogonal axes $(x'x)$, $(y'y)$ located in this plane P and intersecting at the point B.

By way of example, in the case of a multimode fibre having a core diameter of 85 μm, it has appeared desirable to arrange a distance $ab$ of about 2mm and half-amplitude displacements along axes $(x'x)$, $(y'y)$ of about 0.5mm.

Figure 2:
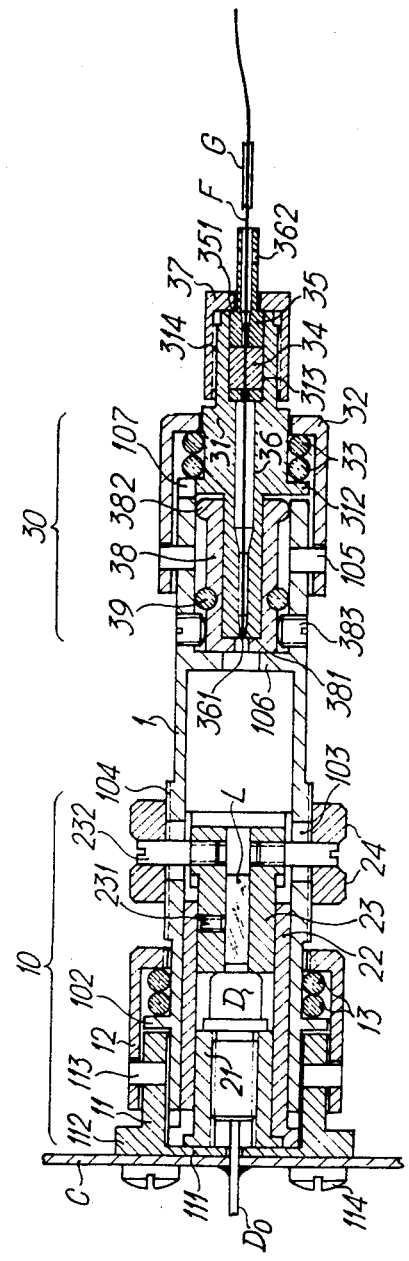
FIG. 2 is a cross-section view of a connector according to the invention.

As shown in FIG. 2 a connector according to the invention comprises essentially a body 1 of general hollow cylindrical shape having, on the one hand at its front part a sub-assembly 10 permitting of assembling a laser diode D and a printed feed circuit C for this diode, as well as a lens L of adjustable position with respect to said diode; and on the other hand at its rear part a sub-assembly 30 permitting of assembling an optical fibre F of adjustable orientation with respect to the geometrical axis of the connector 1.

At its front part 10, the tubular body 1 is assembled with a base 11 of general hollow cylindrical shape with bottom 111 and projecting flange 112 constituting the male part of a first rapid engaging coupler. The female element of this engaging coupler is a connecting union nut 12 covering the said base and co-operating on the one hand for its passage, with a later described screw thread 104 provided at the outer periphery of the body 1, and on the other hand co-operating by means of two helical slots with two pins 113 provided on the base 11 in order to assemble the body and base in an elastic manner thanks to two toroidal joints 13 wedged between the bottom of the nut and a collar 102 of the body 1. The base 11 is directly secured, for example, by means of four screws 114 on the printed feed circuit C of the laser diode D, the tail $D_o$ of which passes through successively the bottom 111 of the base and the circuit C, to be finally soldered to the latter.

The diode D has its casing screwed into a first socket 21 itself fitted with tight friction to a second socket 22 around which the body 1 may slide and in which may also slide a third socket 23 carrying the lens L, which is preferably of the index gradient type.

The socket 23 receives with slight clearance in its central bore the lens L which is secured in a position determined, for example, by means of a pressure screw 231, made for example of plastic material. The socket 23 is on the other hand provided with two diametrically opposite cylindrical and co-linear fingers 232. The fingers 232 slide freely in two diametrically opposite rectilinear slots 202 of the body 1. The thus-guided socket 23 may be displaced by means of two milled nuts 24 co-operating with a screw thread 104 provided at the outer periphery of the body 1, in order to cause the distance between L and D to vary by moving away lens L with respect to diode D. By suitably handling the nuts 24 one can not only operate this displacement of 23 but afterwards lock lens L in the adjusted position.

At its rear part 30 the body 1 is assembled with the rear part of a carrier socket 31 of the fibre F constituting the male part of a second rapid engaging coupling similar to the above-mentioned one. The female element of the engaging means is a connection union-nut 32 covering the body 1 and co-operating by means of two helical slots with two pins 105 provided on the body 1 to assemble the body and the sleeve in an elastic manner, due to two toroidal joints 33 wedged between the bottom of the nut and a collar 312 of the socket 31.

The said rear part of socket 31 is pierced with an almost blind coaxial bore 313 in which is lodged a tightly sliding plug 34 of elastomer material such as silicone rubber as well as a metal piston 35 located behind the said plug and in line with it.

A central channel 36 successively passes through (from the right to left of FIG. 2):

the piston 35, the channel 36 beginning with a diameter corresponding to that of the protective sheath G of the fibre F, and continuing with a control shape to become of narrower diameter;

the plug 34;

finally, the socket 31, the channel 36 beginning with a much larger diameter that that of the fibre and further taking a conical shape to terminate in a calibrated orifice 361 leaving at the end of the fibre F but a very small clearance, for example, of 10 μm compatible with a good reliability of the connection.

A nut 37 covering the rear end of the socket 31 co-operates on the one hand with a screw thread 314 provided at the outer periphery of this socket and on the other hand, at its bottom, with an annular shoulder 351 of the piston 35, to crush the plug 34. The result is that the diameter of the central channel of this plug is reduced until the fibre F passing through it is seized by pinching. It will be observed that the fibre F is not seized by embedding, in the real meaning of the term, but in a supple and elastic manner which considerably reduces the risks of breaking of the fibre in the case of shocks or vibrations. On the other hand the sheath, as will be seen later, is secured to the rear part of the channel of the piston 35 by hafting in and gluing, the introduction of the glue being effected through a lateral hole 362 provided in the piston 35.

The front part of the socket 31 is inserted with tight sliding in a sleeve 38 having on the one hand at its front end a recess stop flange 381 for the abutment of the socket 31 and co-operating likewise in abutment with a recess flange 106 of the body 1, on the other hand at its rear end a toroidal pad 382. The flange 382 is hafted with strong friction in the body 1 but permits displacement in direction (aforementioned $xy$ displacements) of the sleeve 38, and consequently of the end of the fibre F, thanks to four pressure locking screws 383 screwed into the body 1 and acting on the front free end of the sleeve 38; these four screws, colinear two by two, are directed on the whole in two orthogonal directions $(x,y)$ of a cross section of the body 1. Between the body 1 and the sleeve 38 is inserted a toroidal joint 39 which has for its purpose, once the screws 383 are unscrewed, to bring the sleeve 38 to a position of rest coaxial with the body 1, thus permitting to obtain, previously to any adjustment, a sufficient fractional part of the luminous power coming from the lens L for making such adjustment possible.

In order that, at the time of replacing a fibre F by another, the adjustment in position of the orifice 361 of the channel 36 be not accidentally lost, it is necessary to mark very exactly the angular position of the sleeve 31 so as to be able to reproduce it in a precise manner. For this purpose the socket 31 is provided at its periphery with a groove of axial direction co-operating with a key 107 hafted in the body 1.

The method of use of the above-described connector is preferably the following.

At the time of first putting into service one begins by taking an end of reference fibre, the end face of which has been prepared by a breaking technique known per se. This fibre is introduced into the socket 31 up to abutment of its end against a plate applied onto the flat front face of this socket and the fibre is immobilized in the socket by clamping of the nut 37 which compresses the plug 34 by means of the piston 35. The socket 31 is then slid inside the sleeve 38 up to abutment and ratching of the key 107 in the corresponding groove of the socket 31. The socket 31 is immobilized inside the body 1 by means of a nut 32.

The desired adjustments may now be effected by using a measuring apparatus indicating the value of the luminous power coming out of the fibre.

In a first time, one acts on the screws 24 in order to displace the lens L by translation in the direction $z$ and finally locking it in a good position. In a second time, one acts on the screws 383 in order to displace the assembly (31 − 38 -end face of the fibre) in direction $xy$ and finally lock this assembly in a good position. The first adjustment can still be improved by a second one, taking again alternately the adjustments in $z$ and in $xy$.

It is sufficient now to replace the reference fibre by the finally used end fibre F treated and positioned longitudinally like the preceding one, in order that without changing any adjustment the power transmitted remains a maximum one. The sheath G is then additionally immobilized in the piston 35 by introducing glue through the hole 362. One operates likewise in the case of a change of fibre F following a rupture of the latter or for any other reason whatever.

If it is necessary, on the other hand, to replace a diode D which has become faulty, it is necessary to separate the body 1 from the base 11 (to which there remain secured, together with the card C, the socket 21 enclosing the diode and the socket 22) in order to withdraw the faulty diode, replace it by a new one, reassemble the body 1 on the base 11 and resume all adjustments (in z and in xy).

To disconnect the fibre F, it suffices to unscrew the nut 32 and withdraw the socket from the sleeve 38.

It is thus seen that the adjustments of the positions of the lens and of the axis of the fibre with respect to the geometrical axis of the connector may be effected upon each putting in place of a laser diode, while avoiding any repetition of adjustments in the case of successive disconnections and connections and even replacement of the optical fibre.

The coupling efficiency obtained is equivalent to that given by laboratory micro-manipulators.

What we claim is:

1. An adjustable connector assembly for a laser effect diode, the diode feed circuit, a focussing lens and the ends of optical fibres in an optical fibre transmission system comprising:
    a tubular body of circular cross-section generally symetrical about its axis Z;
    a first end of said body constituting the front end of said connector having an adjustable ready lock and unlock diode socket assembly means for said diode and feed circuit and a socket means for the focussing lens, said adjustable diode socket assembly means including first adjustment means to vary the distance along the axis of said tubular body between said diode and said lens;
    the other end of said tubular body constituting the back end of said connector having a fibre ends ready lock and unlock socket means for moving the fibre ends in a transverse direction along the xy directions relative to the axis Z of said tubular body in a plane perpendicular to said axis, said perpendicular plane passing by the focus seen through said lens of a luminous beam emitted by said diode;
    said diode socket assembly means comprising a first socket for the diode frictionally secured in a second socket and thereby secured in a predetermined location in said front end of said connector;
    said socket means for said focussing lens constituting a third socket which slidably fits into said second socket;
    said first adjustment means comprising radial fingers which are threadedly engaged in said third socket to adjustably position said lens by screw movement; and,
    guide means for said radial fingers constituting slots in said tubular body to guide the displacement of said lens relative to each diode and nuts on said tubular body for manipulation of said first adjustment means.

2. A connector as claimed in claim 1 wherein said second socket means for the ends of said fibres fits in a channel in said tubular body and comprises an inner socket along the axis of said fibre in coaxial relation with an outer socket;
    said inner socket having a calibrated orifice on its inner face, and assembly means for said inner socket comprising an elastomer plug, a metal piston, a nut and a movable sleeve with a circular cross section;
    said sleeve having a toroidal flange at one end to tightly fit into the tubular body and said sleeve having symmetrically disposed radial screws about its perimeter at the other end and a toroidal joint to maintain the coaxial relation of the sleeve to the tubular body.

3. A connector as claimed in claim 1 wherein said tubular body includes a first rapid lock and unlock means at the front end and at said diode socket assembly means and a second rapid lock and unlock means at its back end at its fibre ends socket means;
    said first lock and unlock means comprising a male element, a female element and a union nut connection sliding freely on the outer surface of said male element to adapt said male element for locking and unlocking engagement of two helical slots on the male element with two corresponding radial pins projecting from the female elements; a toroidal joint between the bottom of said nut;
    said male element having a collar;
    said female element having secured thereto the feed circuit of said diode, and said second lock and unlock means constituting said inner socket serving the male element and said tubular body serving as the female element.

4. A connector as claimed in claim 3 wherein said inner socket is further provided with a locking means to fix the displacement in the Z direction and in the xy direction;
    said locking means consisting of a groove in the axial direction of the outer periphery of said inner sleeve and a key secured to said inner body, the fixing of the key in said groove fixing the Z and xy directions.

* * * * *